(12) United States Patent
Navab et al.

(10) Patent No.: US 7,064,742 B2
(45) Date of Patent: Jun. 20, 2006

(54) INPUT DEVICES USING INFRARED TRACKERS

(75) Inventors: Nassir Navab, Plainsboro, NJ (US); Yakup Genc, Plainsboro, NJ (US)

(73) Assignee: Siemens Corporate Research INC, Princeton, NY (US)

( * ) Notice: Subject to any disclaimer, the term of this patent is extended or adjusted under 35 U.S.C. 154(b) by 102 days.

(21) Appl. No.: 10/153,519

(22) Filed: May 22, 2002

(65) Prior Publication Data

US 2002/0196343 A1 Dec. 26, 2002

Related U.S. Application Data

(60) Provisional application No. 60/294,855, filed on May 31, 2001.

(51) Int. Cl.
*G09G 5/00* (2006.01)
(52) U.S. Cl. ...................................... 345/156; 382/103
(58) Field of Classification Search .................... 345/8, 345/9, 156–173; 382/103; 348/169
See application file for complete search history.

(56) References Cited

U.S. PATENT DOCUMENTS

| 5,591,972 A * | 1/1997 | Noble et al. ................ 250/330 |
| 5,856,844 A * | 1/1999 | Batterman et al. ..... 348/207.99 |
| 6,353,428 B1 * | 3/2002 | Maggioni et al. ........... 345/157 |
| 6,625,299 B1 * | 9/2003 | Meisner et al. ............. 382/103 |

* cited by examiner

*Primary Examiner*—Jimmy H. Nguyen
(74) *Attorney, Agent, or Firm*—Michele L. Conover

(57) ABSTRACT

An interaction/input device for use in systems utilizing infrared video-based trackers is provided. The interaction/input device is employed by placing markers, e.g., small retroreflective disks, in a predetermined configuration on a planar surface to simulate physical buttons. Once in view of the infrared tracker, the system will recognize the predetermined configuration as the input device which can then be physically manipulated by the user. The user will put their fingers on one of these markers or disks, and in turn, the infrared video-based tracker will recognize this action and process it accordingly. Optionally, an augmented reality system employing the input device of the present invention can also augment simulated menus in the user's view, via a head-mounted display, giving the user the necessary feedback for interaction. By exploiting conventional tracking technology, the interaction/input device can be implemented with minimal additional hardware and minimal additional processing required by the system.

7 Claims, 5 Drawing Sheets

INPUT DEVICES USING INFRARED TRACKERS

PRIORITY

This application claims priority to an application entitled "NEW INPUT DEVICES USING INFRA-RED TRACKERS" filed in the United States Patent and Trademark Office on May 31, 2001 and assigned Ser. No. 60/294,855, the contents of which are hereby incorporated by reference.

BACKGROUND OF THE INVENTION

1. Field of the Invention

The present invention relates generally to infrared tracking systems, and more particularly, to input devices and methods for user interaction with a computer system utilizing an infrared tracking system.

2. Description of the Related Art

Conventional video-based tracking systems have been employed in Virtual Reality (VR) and Augmented Reality (AR) systems to track locations of real-world objects and to estimate the pose, i.e. the position and orientation, of a user of the aforementioned systems. Recent advances in both hardware and software have made it possible to build infrared tracker systems that can run on regular computers with off-the-shelf cameras and low-end video capture boards. An infrared video-based tracker consists of a camera with an infrared-filter lens, a capture board, a set of light-emitting diodes (LEDs) that radiate light in the infrared band, and a set of retroreflective patches or markers. The video obtained from the camera through the capture board is processed on a processor to identify the images of the retroreflective patches within. Because of the filtering of the camera, the only visible segments of the video will be the ones corresponding to the retroreflective markers in the scene. This makes the identification process quite fast yet requires low processing power. In fact, the infrared video-based tracker can easily operate at full frame rates (30 frames per second) without overloading the system processors.

Furthermore, the infrared video-based tracker can also be realized by using a chip on board the camera. Since the identification process is quite simple, it is possible to put the identification algorithm on a small chip that can be placed on the camera itself. This will reduce the processing requirement to zero on the main system processor.

Similar technological advances in wearable computers equipped with wearable displays, such as head-mounted displays (HMDs), necessitated new means of input and interaction with these wearable computers. The conventional means of input and interaction with these new types of computers, such as a mouse and keyboard, are not adequate and have proved to be very cumbersome. More elaborate methods of interaction, such as speech driven ones, have not come to a mature state yet. They are either too hard to integrate due to their inherent difficulties, such as "training" the speech driven system, or require quite a bit of processing power overloading the processor on these wearable computers which tend to be less powerful compared to conventional ones.

SUMMARY OF THE INVENTION

It is therefore an object of the present invention to provide an interaction/input device for use with an infrared video-based tracking system.

It is another object of the present invention to provide an input device and method for use with an infrared video-based tracking system which is easy-to-use and intuitive for a user, thus enhancing the experience of the user with the system.

It is a further object of the present invention to provide an interaction device which requires minimal additional hardware and minimal additional processing power.

To achieve the above and other objects, a new interaction/input device for use in systems utilizing infrared video-based trackers is provided. By exploiting conventional tracking technology, the interaction/input device can be implemented with minimal additional hardware and minimal additional processing required by either a system processor or an on-board camera processor. The interaction/input device is employed by placing markers, e.g., small disks, in a predetermined configuration on a planar surface to simulate physical buttons. Once in view of the infrared tracker, the system will recognize the predetermined configuration as the input device which can then be physically manipulated by a user. The user will put their fingers on one of these markers or disks, and in turn, the infrared video-based tracker will recognize this action and process it accordingly. Optionally, the system employing the input device of the present invention can also augment simulated menus in the user's view giving the user the necessary feedback for interaction.

The interaction/input devices of the present invention are configuration dependent. That is, a system employing an infrared video-based tracker, such as an augmented reality system or mobile wearable computer, recognizes a specific input device by its configuration when the input device comes into the viewing field of an infrared-filtered camera. The system detects a configuration of retroreflective markers and compares it to known configurations stored in the system to determine the functionality of the input device, for example, a three-marker configuration may function as a mouse.

Since the interaction/input device of the present invention is realized through a video-based tracking system, the input device is not physically connected to the system employing it, and therefore, the input device is a passive device. The input device can be easily modified through software programming according to the needs of the user without changing the tracking device, which is the active part of the system, or the configuration of the input device.

According to one aspect of the present invention, a system is provided including a video-based tracking system for locating real-world objects; a processor for determining the position and orientation of a user's view based on the location of the real-world objects; and an input device including a plurality of markers placed in a predetermined configuration in the real world, wherein the tracking system locates the input device and the processor determines its functionality based on its configuration.

According to another aspect of the present invention, in a system including a video-based tracking system for locating real-world objects, and a processor for determining the position and orientation of a users view based on the location of the real-world objects, an input device is provided including a plurality of markers placed in a predetermined configuration in the real world, wherein the tracking system locates the input device and the processor determines its functionality based on its configuration.

According to a further aspect of the present invention, in a system including a video-based tracking system for locating real-world objects, and a processor for determining the position and orientation of a user's view based on the location of the real-world objects, a method for interacting with the system is provided. The method including the steps of providing an input device including a plurality of markers placed in a predetermined configuration in the real world; capturing video of the real world; analyzing the captured video to determine if the plurality of markers are visible; if the plurality of markers is visible, comparing the configuration of the plurality of markers to configurations stored in the system; if a match of configurations occurs, determining the input device is visible; and loading the input device's functionality into the system to be available for a user to interact with the system. The method further includes the steps of determining if at least one of the plurality of markers is not visible; and if at least one marker is not visible, performing a function associated with the at least one marker.

BRIEF DESCRIPTION OF THE DRAWINGS

The above and other objects, features, and advantages of the present invention will become more apparent in light of the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

New input devices and methods therefor that exploit the advances in infrared video-based tracking systems are provided. The configuration dependent input devices include intuitively placed retroreflective markers that emulate various button combinations. The video-based tracker system tracks these input devices and interprets a user's actions converting them into input commands for a computing system. Depending on the display device used, the images of the input devices of the present invention can be augmented to simulate menus from which the user can choose actions like "read my email" or "check the news".

By way of example, an augmented reality (AR) system which utilizes infrared video-based tracking is used to describe the interaction/input devices of the present invention. Generally, an augmented reality system includes a display device for presenting a user with an image of the real world augmented with virtual objects, i.e., computer-generated graphics, a tracking system for locating real-world objects, and a processor, e.g., a computer, for determining the user's point of view and for projecting the virtual objects onto the display device in proper reference to the user's point of view.

Figure 1A:
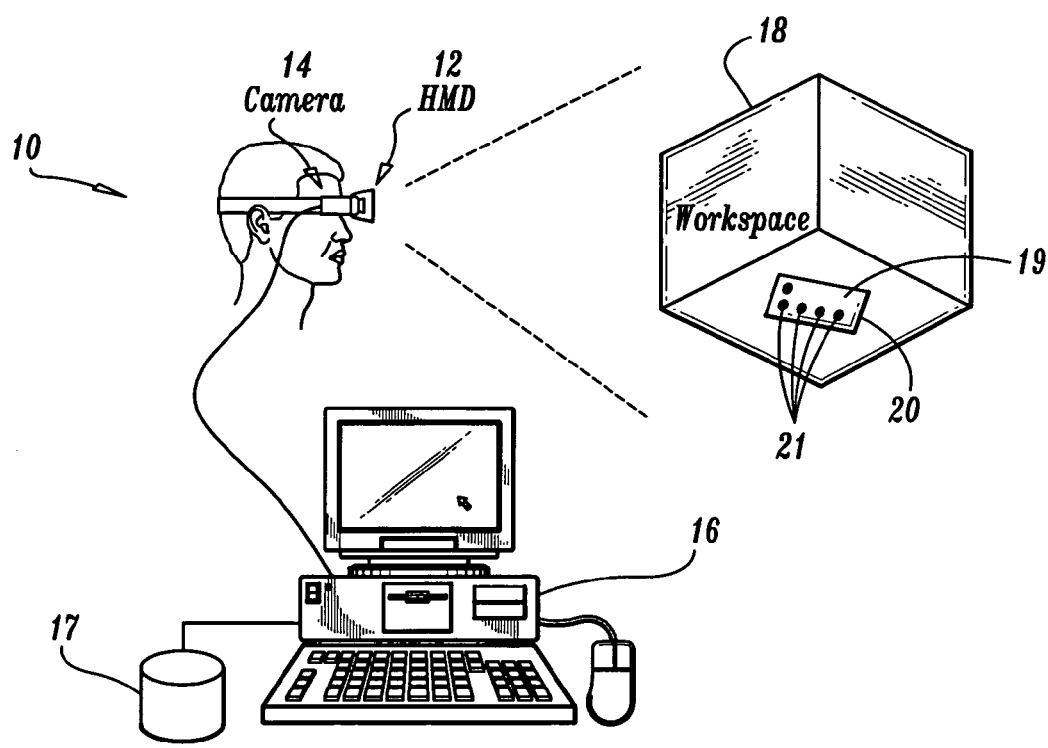
FIG. 1A is a schematic diagram illustrating a computer system utilizing infrared video-based tracking in accordance with the present invention.

Referring to FIG. 1A, an exemplary augmented reality (AR) system 10 to be used in conjunction with the present invention is illustrated. The AR system 10 includes a head-mounted display (HMD) 12, an infrared video-based tracking system 14 and a processor 16, here shown as a desktop computer, coupled to storage device 17. For the purposes of this illustration, the AR system 10 will be utilized in a specific workspace 18 which includes an input device 20 of the present invention. Here, input device 20 includes a configuration of five retroreflective markers 21 on a planar surface of an object 19, such as a board. Although shown as being utilized in a fixed workspace with a desktop computer, the AR system which employs an input device of the present invention can be configured to be a mobile system wearable by a user. For example, the processor 16 may be a notebook computer, handheld computer, pocket pc or an other known mobile computing device and the input device 20 may be configured on a pliable material which can be carried or worn by the user, for instance, on their hand or forearm. It is to be understood that the input device is a passive device not physically connected to system 10, for example, by wires, and is portable.

Figure 1B:
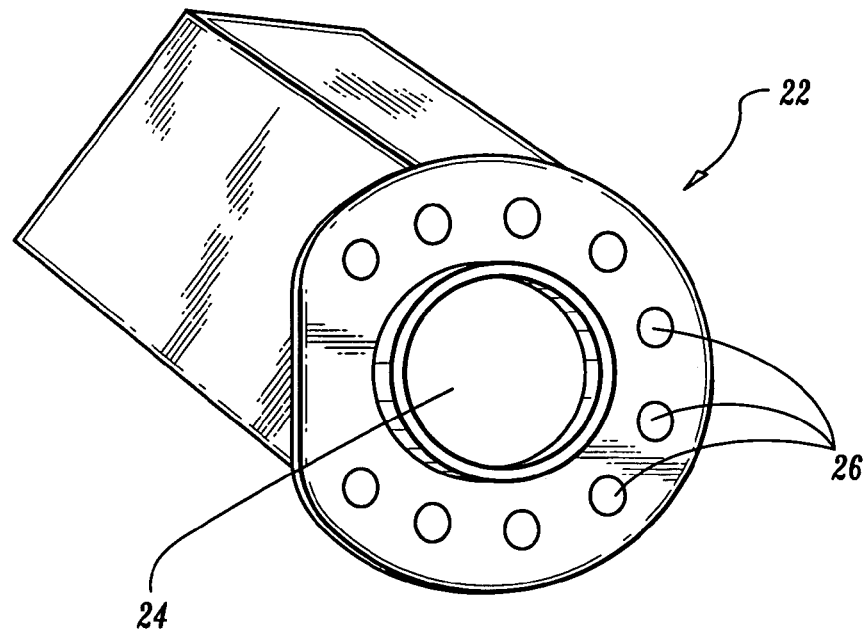
FIG. 1B is a perspective view of an infrared tracker camera with infrared illumination LEDs.

Referring to FIGS. 1A and 1B, the tracking system 14 used in conjunction with the input device of the present invention will be described. Generally, the infrared video-based tracking system 14 includes a camera 22 with an infrared-filter lens 24 and a plurality of infrared illumination light-emitting diodes (LEDs) 26 mounted around the lens 24; a video capture board mounted in the processor 16; and a set of retroreflective markers, e.g., a circular disk or square tile. Video obtained from the camera 22 through the capture board is processed in the processor 16 to identify the images of the retroreflective markers. Because the video captured is filtered, the only visible items will be the ones corresponding to the retroreflective markers, i.e., items reflecting light in an infrared frequency. In the AR system, the location of the markers are known within a specific workspace and are used to track real-world objects and to determine the pose (position and orientation) of a user.

Figure 2:
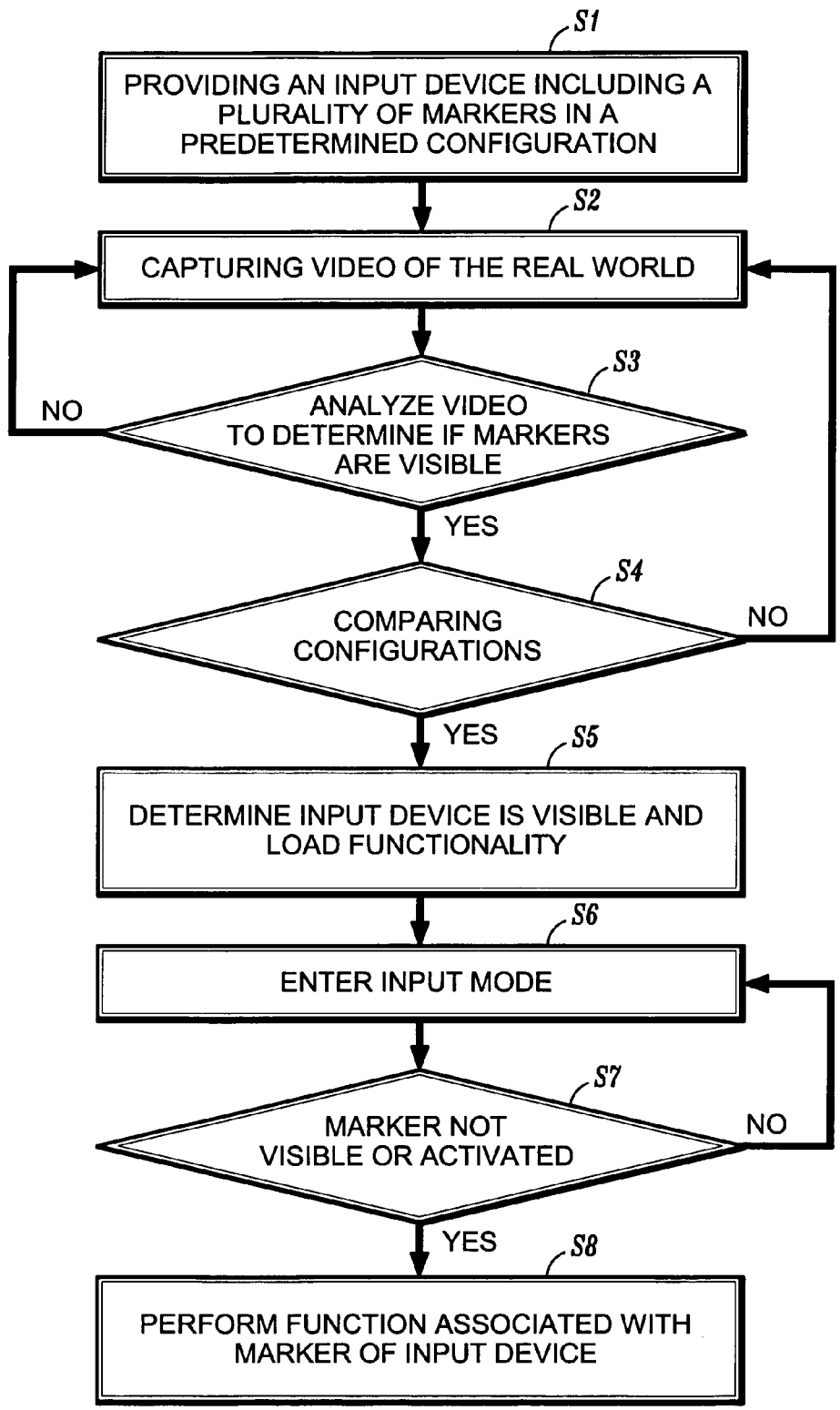
FIG. 2 is a flowchart illustrating a method of interacting with a system employing an input device of the present invention.

In the same manner the AR system identifies the markers placed in a workspace, for location tracking, the AR system can identify a set of markers 21 laid out in a specific configuration (Step S1) to determine that it is an input device 20, as exemplified in the method of FIG. 2. As the camera 22 of the tracking system 14 scans a scene, video captured is analyzed to determine if any retroreflective marker 21 has come into view (Step S2). Once it has been determined that a marker 21 is in view of the user and/or tracking system (Step S3), the processor 16 compares the configuration of the markers in the scene with configurations stored in the processor 16 or in the storage device 17 coupled to the processor 16 (Step S4). If a match occurs, it is determined an input device is visible to the user and the input device's functionality is loaded into the system to be available to the user (Step S5). Once the input device becomes visible, the AR system 10 can go into a menu/input mode (Step S6) and wait for the user's actions for some input events. The AR system 10 will determine if a user is interacting by determining if a marker of the input device 22 is visible or not (Step S7), as will be described in detail below. If the marker is not visible, e.g., by the action of the user covering the marker, the system will determine the marker is activated and perform an associated function (Step S8).

Figure 3A:
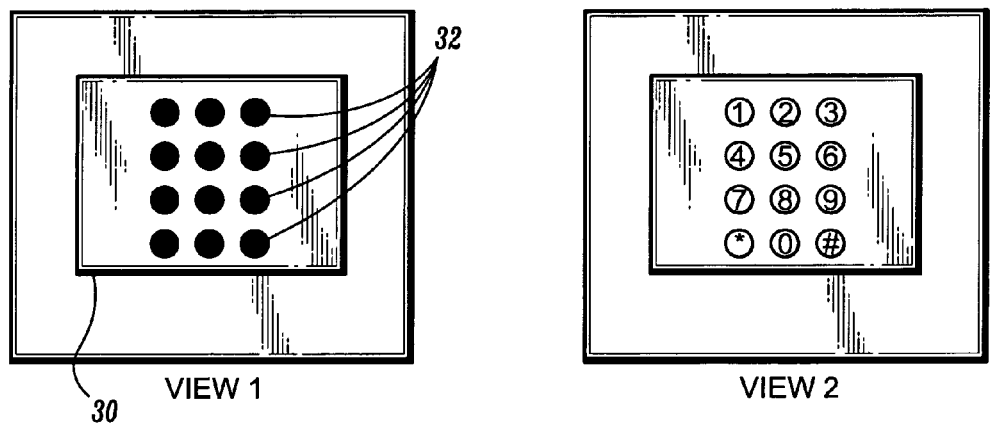
FIGS. 3A and 3B illustrate two examples of configuration dependent input devices in accordance with the present invention.
Figure 3B:
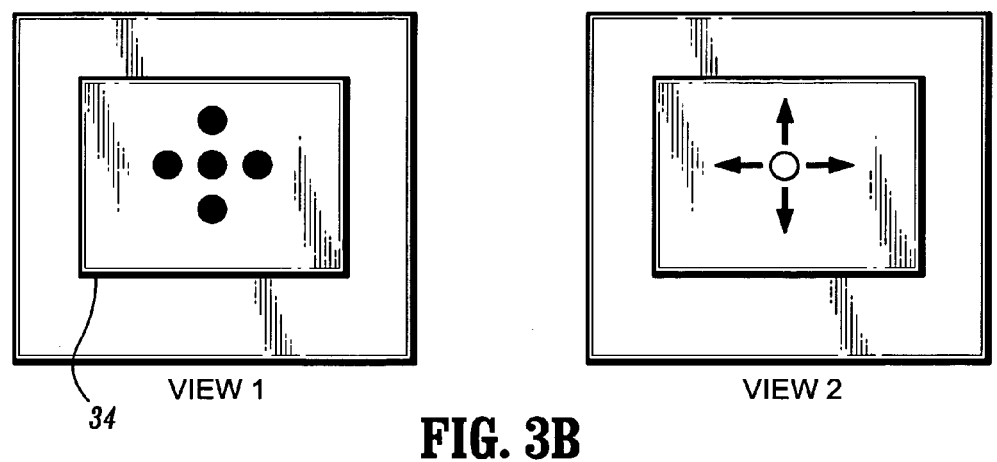

It is to be understood the type and functionality of an input device of the present invention is determined by the processor based on the known specific configuration of markers placed in the physical world, e.g., placed in a specific workspace or on a planar board carried by the user. Therefore, any number of input devices can be realized by setting a specific configuration of markers for each input device, associating a function to each configuration and storing the configuration in the processor and/or storage device. Referring to FIG. 3, for example, a 4×3 matrix of markers 32 can be configured to simulate a numerical keypad input device 30, like those used on a telephone. The left view of FIG. 3A shows the configuration of markers visible to the user and the right view illustrates the functionality available to the user. Similarly in FIG. 3B, a cross-like configuration 34 can be assembled to simulate arrow keys where the uppermost and lowermost markers represent up and down arrow keys, etc. When used in conjunction with an AR system, a user's view will be augmented with graphics and the user will actually see the view shown in view 2 of FIGS. 3A and 3B.

Furthermore, a combination of one or more input devices may be placed around the workspace at one time each corresponding to a different input mode or, even in a multi-user environment, to different users.

An illustration of how a user interacts with a system employing an input device of the present invention will be described below in conjunction with FIG. 4.

Figure 4:
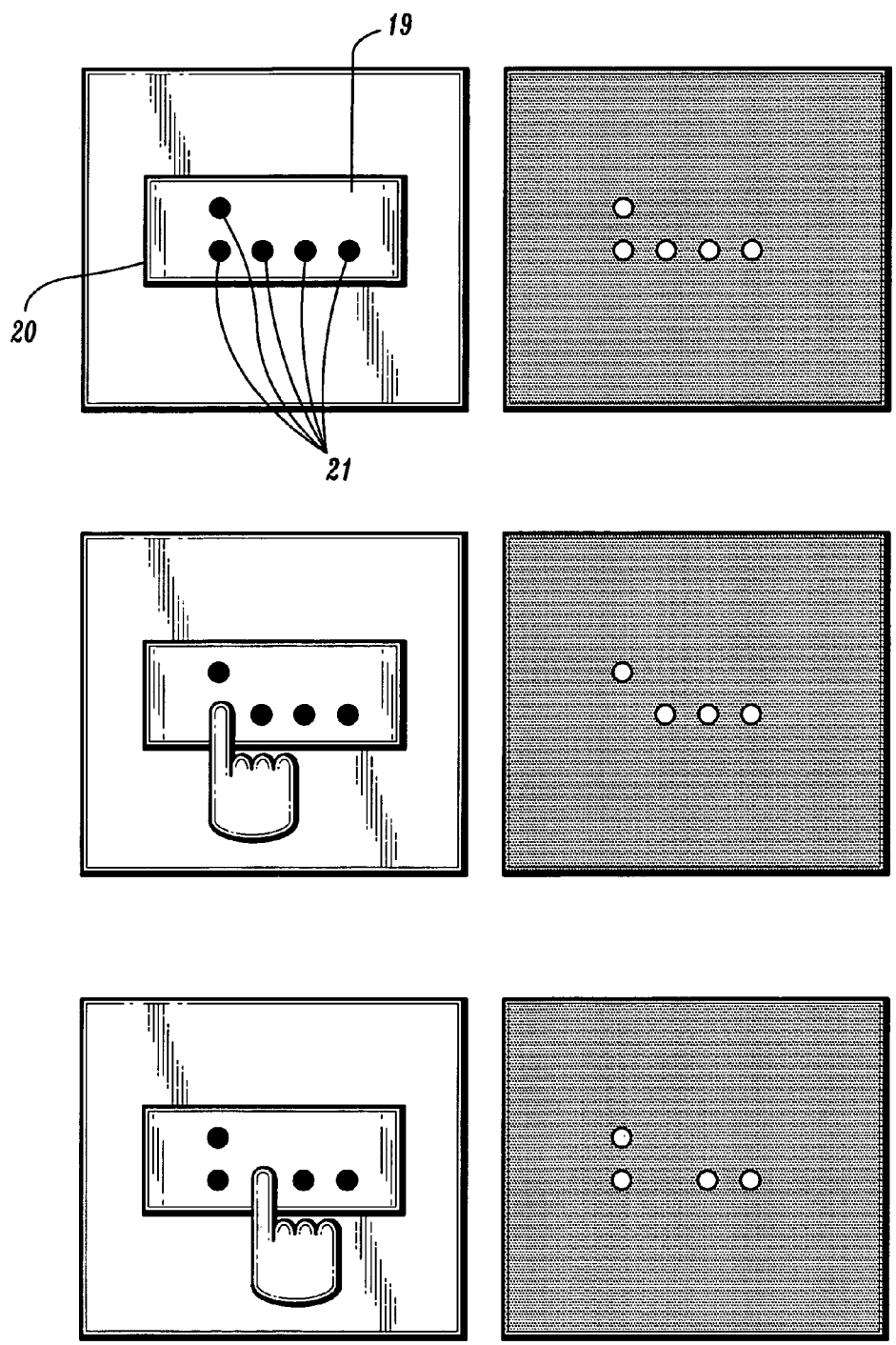
FIG. 4 illustrates several views of a computer system employing an input device in accordance with the present invention, where column 1 represents real-world views as seen by a user and column 2 represents views as seen from the infrared tracker camera.

FIG. 4 illustrates several views of a computer system employing an input device in accordance with the present invention, where column 1 represents real-world views as seen by a user and column 2 represents views as seen from the infrared tracker camera.

Referring to FIG. 4, the first row shows a computer system entering an input mode. The first view illustrates a real world view of the input device 20. The user would see a set of retroreflective markers 21 on a planar surface 19. The second view of the first row illustrates how the infrared video-based tracking system would see the input device. The tracking system will only see the markers that reflect the infrared light. The processor will determine that four markers are visible in an L-shaped configuration and will then search the configurations stored for a match. Here, the processor will determine that the configuration is to function as a mouse and, since all five markers are visible, the input device is in an idle state awaiting input actions from the user.

The second row of FIG. 4 illustrates a user choosing an action. The first view of the second row shows the user placing a finger over the bottom leftmost marker. The second view shows how the tracking system will view this action. The processor will determine the marker is not visible and perform the function that is associated with the marker, e.g., a left mouse click. Similarly, the third row shows the user covering, or activating, the second marker to perform another action.

Now, an illustration of how a user interacts with an augmented reality (AR) system employing an input device of the present invention will be described below in conjunction with FIG. 5.

Figure 5:
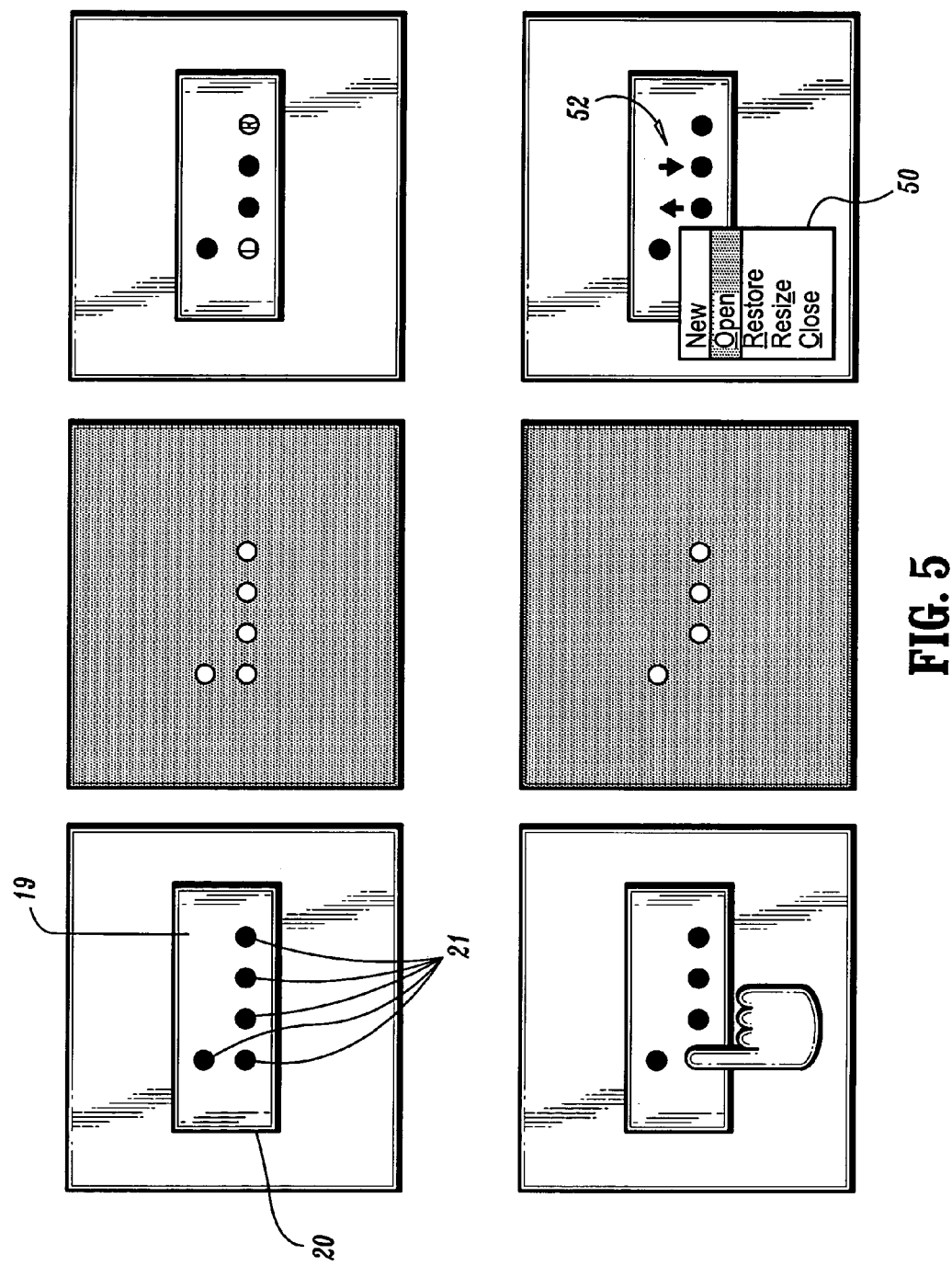
FIG. 5 illustrates several views of a user interacting with an augmented reality system employing an input device in accordance with the present invention, where column 1 represents real-world views as seen by the user, column 2 represents views as seen from the infrared tracker camera and column 3 represents augmented views of the user.

FIG. 5 illustrates several views of a user interacting with an augmented reality system employing an input device in accordance with the present invention, where column 1 represents real-world views as seen by the user, column 2 represents views as seen from the infrared tracker camera 24 and column 3 represents augmented views of the user.

The first row in FIG. 5 shows the AR system entering a menu/input mode. The first view illustrates a real world view of the input device 20. The second view of the first row is a view of the input device 20 through the infrared-filtered camera 24, wherein all retroreflective markers 21 are visible. Through the use of the tracking system and processor, the AR system is able to determine the five markers 21 of the input device 20 are in the users view. Once the configuration and functionality of the input device is determined, the AR system will augment the user's view of the input device as in the third view of the first row. Here, the five markers are augmented with computer-generated graphics to simulate buttons or menus, e.g., the bottom leftmost marker is augmented with label "L" for left mouse button and the bottom rightmost marker is labeled "R" for right mouse button.

The second row of FIG. 5 illustrates the user interacting with the system. In the first view of the second row, the user places their finger on the first marker which corresponds to the "L" or left mouse button. Once the AR system determines the user has covered the marker or simulated a click of the left mouse button, the AR system will augment the user's view by inserting a graphic menu 50 with several options, as shown in the third view of the second row. In addition, up and down arrows 52 may be placed above the second and third markers of the bottom row during this mode to assist the user in selecting the option desired. It is to be understood that the up and down arrows are only augmented in the user's view during this mode. It is also to be understood that whenever a single marker is activated the remaining markers can be augmented to reveal other options of the activated marker.

New input devices and methods to be used with infrared video-based tracking systems have been described. The interaction/input devices and methods of the present invention provide intuitive, easy-to-use means of interacting with the system. In particular for an augmented reality system, the system gives the user visual feedback in forms of augmentation, e.g., menus, to facilitate the interaction.

The input devices of the present invention do not put any additional burden on the running or processing of the computing system since the system is already determining locations of markers for tracking purposes. The tracking system intelligently can decide if the user is in the input/interaction mode by determining if the user is looking at the various markers in a scene.

While the invention has been shown and described with reference to certain preferred embodiments thereof, it will be understood by those skilled in the art that various changes in form and detail may be made therein without departing from the spirit and scope of the invention as defined by the appended claims. For example, the input device can be employed in various types of AR systems, such as optical see-through or video see-through systems. Additionally, the input device of the present invention can be used in conjunction with different types of display devices, e.g., a computer monitor, video-capable mobile phone, personal digital assistant (PDA), etc.

What is claimed is:
1. A system comprising:
   a video-based tracking system for locating real-world objects;

a processor for determining the position and orientation of a user's view based on the location of the real-world objects;

a display device for displaying an augmented reality image to the user, the augmented reality image being a view of real-world objects augmented with virtual objects; and an input device including a plurality of markers placed in a predetermined pattern in the real world, the input device being physically separate from the video-based tracking system, wherein the tracking system locates the input device and the processor determines its functionality based on the pattern of the markers such that a user can change the pattern of the markers by selectively making at least some of the markers visible and covering at least some of the markers thereby forming a new pattern, wherein the new pattern corresponds to a different programmed response to be performed by the tracking system, the markers emulating button functions such that at least one marker is augmented on the display device with a virtual object representing a menu of selectable options, the video-based tracking system identifying the new pattern and converting the new pattern into an associated function that is performed by the processor.

2. The system as in claim 1, wherein the plurality of markers are set on a planar surface of said input device, said input device being carriable by the user.

3. The system as in claim 1, wherein the video-based tracking system is an infrared video-based tracking system.

4. The system as in claim 3, wherein the infrared video-based tracking system comprises:

a camera for capturing video of the real world, the camera including an infrared-filter lens for capturing light in an infrared band; and a plurality of infrared illumination light-emitting diodes (LEDs) for providing the infrared light.

5. The system as in claim 3, wherein the plurality of markers of the input device are retroreflective.

6. The system as in claim 1, wherein the plurality of markers of the input device are augmented on the display device with virtual objects.

7. The system as in claim 1, wherein when at least one of the plurality of markers is activated the remaining markers are augmented with virtual objects corresponding to options of the activated marker.

* * * * *